US00RE42941E

(19) United States
(12) Reissued Patent
Salcido

(10) Patent Number: US RE42,941 E
(45) Date of Reissued Patent: Nov. 22, 2011

(54) NOSE FILTER

(76) Inventor: Eduardo Salcido, Thousand Oaks, CA (US)

(21) Appl. No.: 12/035,411

(22) Filed: Feb. 21, 2008

Related U.S. Patent Documents

Reissue of:
(64) Patent No.: 7,004,165
Issued: Feb. 28, 2006
Appl. No.: 10/753,281
Filed: Jan. 9, 2004

(51) Int. Cl.
*A62B 23/02* (2006.01)

(52) U.S. Cl. ..... 128/205.27; 128/206.18

(58) Field of Classification Search ..... 128/201.25, 128/204.12, 205.25, 205.27, 205.29, 206.11–206.28, 128/207.11, 207.13, 207.18
See application file for complete search history.

(56) References Cited

U.S. PATENT DOCUMENTS 270,655 A * 1/1883 Fruhling ..... 128/205.29
390,027 A * 9/1888 Locke ..... 128/206.11
535,718 A * 3/1895 Nagler ..... 128/206.12
1,562,302 A * 11/1925 Dean et al. ..... 128/206.13
1,914,418 A * 6/1933 Goyena ..... 128/206.18
2,087,042 A * 7/1937 Phillips ..... 128/206.18
2,295,321 A * 9/1942 Anderson ..... 128/206.18
2,447,450 A * 8/1948 Williams ..... 128/206.13
2,845,927 A * 8/1958 Hill ..... 128/206.17
4,981,134 A * 1/1991 Courtney ..... 128/207.12
4,984,302 A * 1/1991 Lincoln ..... 2/206
5,603,317 A * 2/1997 Farmer ..... 128/205.27
6,752,149 B2 * 6/2004 Gillespie et al. ..... 128/204.12

* cited by examiner

*Primary Examiner* — Steven O Douglas
(74) *Attorney, Agent, or Firm* — Trojan Law Offices

(57) ABSTRACT

A filtering apparatus fits adjacent to the nostrils and nose of the user and includes a rigid base for retaining a filtering material thereon through which the user may breathe. The filter material takes the form of an open-cell foam, in the form of a pad, which is removably held between retainer members carried on the rigid base. The foam pad includes a peripheral sidewall and defines an open cavity in the thickness thereof. A clamping device included in the base has an upper and lower plate that are joined together by fasteners. A supporting arrangement for facial wearing comprises a pair of elongated ear support members arranged in spaced-apart relationship and joined together to define a pivot or hinge mechanism that is captured beneath the opposing surfaces of the base plates.

3 Claims, 2 Drawing Sheets

30
31
32
33
34
35
36
37
38
40
41
42
43
44
45
8

NOSE FILTER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to the field of ambient air filtering, and more particularly to a novel nose filter having a base on which a removable foam pad is retained and which includes a pair of pivotal elongated members adapted to be supported on the ears of a wearer so that the foam pad resides immediately adjacent the nostrils of the nose and wherein the foam is of an open-cell construction permitting the user to breathe while filtering micro-particles of contamination or foreign matter.

2. Brief Description of the Prior Art

In the past, it has been the conventional practice to use facial filters, which generally include a facial mask which is retained on the head of the user by means of tieable strings, elastic bands or a system of straps and buckles. Such a facial mask may cover only the nose or both the nose and mouth, depending on the need of the user. Such a mask is conventionally constructed from an apertured diaphragm, micro-mesh paper construction, a micro-mesh screen or the like. Such filters are not supported except by the attachment means used to hold the filter onto the head of the user.

Problems and difficulties have been encountered with such facial filters, which stem largely from the fact that there is no support for the filter material other than the straps, bands, or elastic which holds the filter material onto the facial area of the user. Such a facial filter cannot readily be removed from the facial area since the filter material has a tenancy to flex and collapse. The facial diaphragm or filter material is not readily supported so that dislodgement or voids between the soft filter material and the skin of the user are experienced permitting contaminated air to creep beneath the filter material into the breathing system of the user.

Therefore, there has been a long-standing need to provide a facial filter, particularly for the nose, which will reside immediately adjacent the nostrils of the user and which mounts the filtering material onto a rigid, non-bendable support that permits ready removal and replacement of the filter material. Means should be provided for mounting the base and the filter material on the facial area of the user employing the user's ears to support spaced-apart, elongated pivotal members, similar to those used on spectacles.

SUMMARY OF THE INVENTION

Accordingly, the above problems and difficulties are avoided by the present invention which provides a novel filtering apparatus that fits immediately adjacent to the nostrils and nose of the user, includes ear supporting means and which includes a base having a holder means for retaining a filtering material, such as a close-mesh, open-cell foam, through which the user may breathe. Breathing air passing through the close-mesh filter will extract contaminates and foreign particles of a minute nature to insure clean air breathing by the user. The filter material takes the form of an open-cell foam, in the form of a pad, which is removably retained between holder or retainer plates carried on the base. The foam pad includes a peripheral sidewall, so as to define an open cavity in the thickness of the foam pad. The base holder or retainer includes upper and lower plates that are joined or clamped together by a fastening means. A special feature of the invention includes a supporting means for facial wearing which comprise a pair of elongated ear support members arranged in spaced-apart relationship and having one end of each member joined together to define a pivot or hinge mechanism that is captured beneath the opposing surfaces of retainer or holder the plates. Thereby, the ear support members pivot with respect to the base in order to provide proper fitting on the nose of the user, when the elongated members are supported on the ears of the user.

In one form of the invention, the plates of the base include open apertures or perforations in order to increase the volume of breathing air passing through the filter pad and, cushion means may be provided on the free ends of the support members in order to prevent rubbing or damage to the skin of the user's ears.

Therefore, it is among the primary objects of the present invention to provide a novel nose filter adapted to be placed immediately adjacent the nostrils of the user's nose and that may be removably supported on the ears of the user so that the filter remains in place.

Another object of the present invention resides in providing a nose filter which includes a pad of open cell foam, removably carried on a base that is pivotally attached to a pair of ear support members intended to be resting on the ears of the user to maintain the filter material adjacent the user's nose.

Yet another object resides in providing a nose filter having an open cell micro-cellular foam pad carried on a base which is maintained in position adjacent the nostrils of the user so as to interfere or remain placed in the breathing path of the user in order to filter contamination and foreign matter from breathable air.

Still a further object resides in providing a novel nose filter for facial installation whereby a micro-cellular foam is placed adjacent to the nostrils of the user and maintained in position by a pivotally mounted set of ear support members that rest on the ears of the user.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF PREFERRED EMBODIMENT

Figure 1:
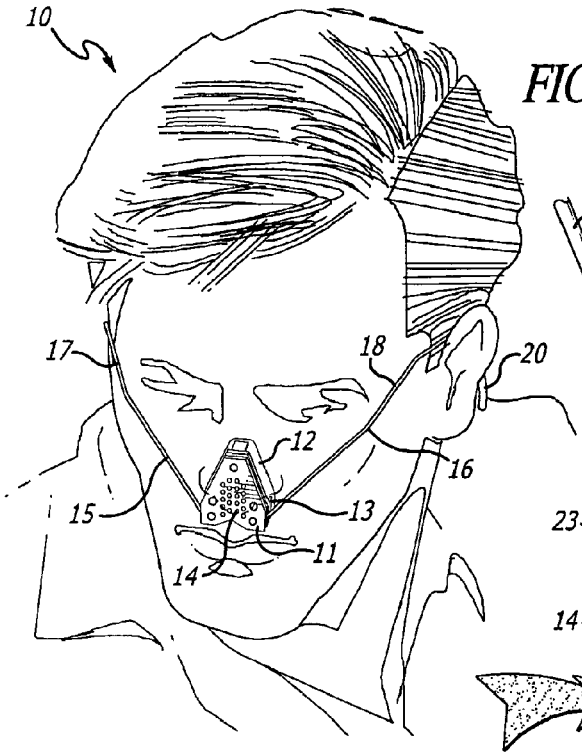
FIG. 1 is a front perspective view showing the novel nose filter incorporating the present invention worn by a user.

Referring to FIG. 1, the novel nose filter of the present invention is illustrated in the general direction of arrow 10, which includes a base assembly 11 mounting a filter pad 12 removably carried thereon. The base assembly includes retainers, such as a retainer tab 13, which holds the filter pad 12 onto the base assembly in combination with other tabs. In one form of the invention, the base assembly may include a plurality of openings or apertures, such as identified by numeral 14, that are in the breathing path of the user, so as to permit a greater volume of air to pass therethrough.

It is important to note that the base assembly 11 and the filter pad 12 are maintained in the position adjacent to the nostrils of the user against the nose of the user by means of support members 15 and 16 that terminate in free ends 17 and 18, which include portions, such as portion 20, that pass over the ear and behind so as to rest on the ears for support.

Figure 2:
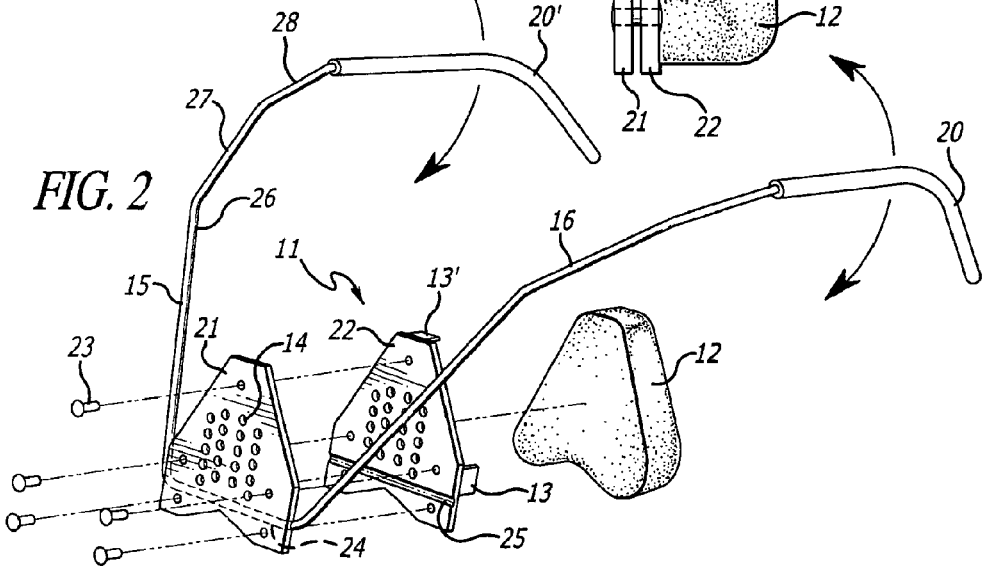
FIG. 2 is an enlarged, exploded perspective view showing the novel nose filter as used in FIG. 1.

Referring now to FIG. 2, it can be seen that the base assembly 11 comprises a pair of clamp plates 21 and 22 that are joined or clamped together by means of a plurality of fasteners such as indicated by fastener 23. The plate 21 may be considered a lower plate, while the plate 22 may be an upper plate and the upper plate includes the retainers 13 and 13' for holding the filter pad 12 in position on the base assembly. The filter pad 12 is preferably composed of open cell micro-cellular foam composition so that air will pass through with contaminates retained in the confines of the internal passageway of the foam.

FIG. 2 also illustrates that the ear support members 15 and 16 have ends which terminate at opposite ends of a hinge or pivot bar 24. The pivot bar 24 resides within an elongated notch 25, formed on the surface of plate 22. A similar notch or groove is provided on the opposing surface on plate 21 so that the bar 24 is indexed with and captured between the two opposing surfaces in such a manner that rotation is permitted. The fasteners 23, for holding the plates together, are sufficient to retain the bar in movable position between the opposing surface of the plates between the notch or groove 25.

It is also illustrated that each of the respective support members 15 and 16 are configured so as to have a linear segment 26 extending from the end of bar 24 and incorporating an angular segment 27, which ends in a second linear segment 28, followed by extending the curved or ear engaging portion 20 or as indicated by numeral 20' in connection with support member 15. It is to be understood that the support member 16 includes the same configuration as described with respect to support member 15. A cushion or soft material of some nature is placed over the segment 20 and 20' so as to prevent injury or damage to the skin of the user when the end segments are placed about the ear of the user. The arrows associated with support members 15 and 16 show that the support members move or pivot in unison in the grooves 25 with respect to the base 11. Thus, the filter pad 12 may be properly fitted to a comfortable location about the nostrils of the user's nose and the support members will comfortably hold the filter in position.

Figure 3:
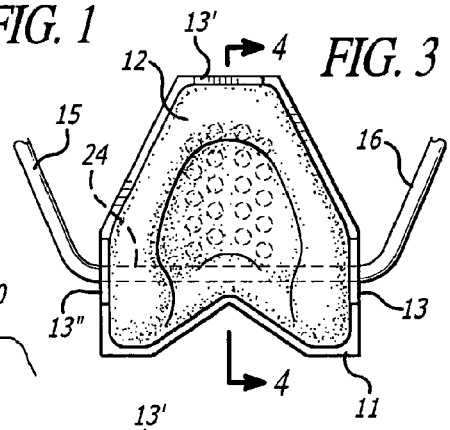
FIG. 3 is a top view of the nose filter.
Figure 4:
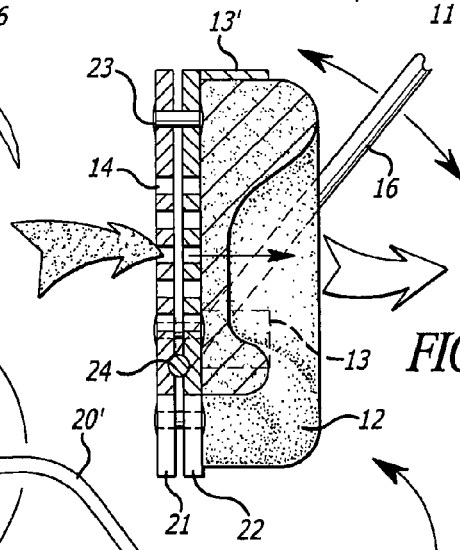
FIG. 4 is a transverse, cross-sectional view of the nose filter taken in the direction of arrows 4—4 thereof.

Referring now in detail to FIGS. 3 and 4, it can be seen that the filter pad 12 is supported on the base assembly 11 by the retainer tabs 13, 13' and 13". The pad is merely slipped between the tabs which are bendable so as to engage and hold the pad in position during use. However, the pad may readily be slipped from the base assembly 11 for replacement or cleaning. The filter pad 12 may be suitably washed or replaced at the desire of the user.

In FIG. 4, it can be seen that breathable air is passed through the filter via apertures 14 in both plates 21 and 22, and through the open-celled foam 12. The bar 24 is held between the opposing surfaces of the plates 21 and 22 of the base assembly and resides within the groove 25. The ear support members 15 and 16 are rotatable with respect to the base assembly and filter pad since the bar 24 is rotatably mounted at this end of the base assembly. The filter pad 12 includes a three-sided wall defining a cavity therebetween. Such a cavity not only assists in conforming the pad to the nose of the user but provides a breathable condition whereby air can pass through the filter from the lateral sides as well as through the apertures 14.

Figures 5, 6, 7, 8:
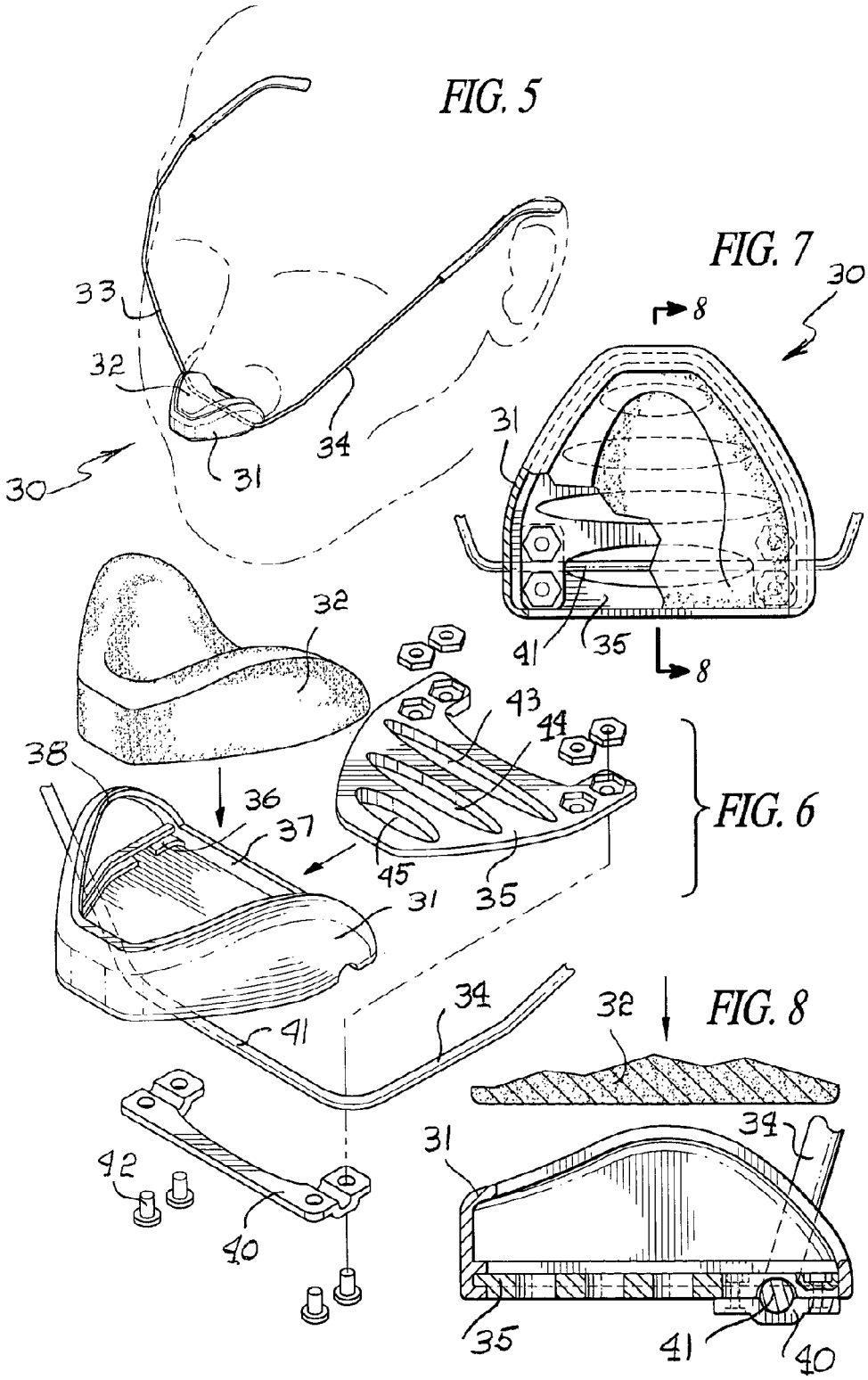
FIG. 5 is a perspective view of another version of a nose filter using the present invention.
FIG. 6 is an exploded perspective view of the nose filter shown in FIG. 5.
FIG. 7 is a top plan view, partially broken away, to illustrate complete assembly.
FIG. 8 is a transverse, cross-sectional view of the nose filter shown in FIG. 7 as taken in the direction of arrows 8—8 thereof.

Referring now to FIG. 5, another embodiment of the invention is illustrated in the general direction of arrow 30 which includes a cup-like form or base assembly 31 into which a filter 32 is disposed. The filter is similar to the filter previously described in that preferably it is a close-mesh foam material. The nose filter 30 includes a pair of ear support members 33 and 34 as previously described with respect to the embodiment shown in FIGS. 1–4 respectively.

Referring now in detail to FIG. 6, the components of the nose filter 30 are illustrated wherein the form or base assembly 31 includes an open-cavity into which a rigid support plate 35 is inserted. The peripheral edges of plate 35 are placed within a groove 36 formed in the assembly 31 and once inserted, the shoulders of the groove will hold the plate in position. A rear lip 37 retains the plate from dislodgement. It is also to be noted that the lip 37 progresses around the peripheral edge of the cup-shaped assembly 31 and it is the filter 32 which fits within the cavity of the cup form or base assembly with the edge marginal lip 38 retaining the material in position. In order to mount the ear pieces 33 and 34, a clamp member 40 is employed which mates with the underside of plate 32 and serves as a clamp for rotatably coupling the pivot or hinge bar 41 to the base assembly. Such arrangement is as previously described with respect to the embodiment shown in FIGS. 1–4 inclusive. A plurality of fasteners, such as fastener 42, may be employed for retaining the plates 35 and 40 together.

Referring now in detail to FIGS. 7 and 8, it can be seen that once assembled, the filter material 32 operates as a cushion as well as a filter and that breathable air will pass through vents 43, 44 and 45 as shown in FIG. 5. The vents permit contaminated air to enter the nose filter through the plate 35 after progressing through the bottom of the filter material.

FIG. 8 further illustrates the pivotal mounting of the bar 41 between the opposing surfaces of the plates 35 and 40 and that the plates include conformal grooves which serve to index and hold the bar 41 in position.

Therefore, it can be seen that the nose filter of the present invention can be removably placed in the facial area of the user so that the filter material itself is held adjacent to the nose and nostrils of the wearer while the ear support members are positioned over and behind the ears. The filter pad 32 is easily removed for cleaning or maintenance purposes and can readily be inserted into the cup base assembly 31 in a convenient manner.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A nose filter comprising:

a base assembly;

a filter material;

releasable attachment means carried on peripheral edge marginal regions of said base assembly for retaining said filter material thereon;

a single one-piece U-shaped ear support means pivotally carried on said base assembly for removably retaining said base assembly and said filter material on a facial area;

said base assembly includes a pair of rigid plates supporting said filter material and said ear support means;

said rigid plates having mated and aligned conformal grooves for pivotally mounting said ear supporting means;

said single one-piece U-shaped support means having a pair of support members with each member having a semi-loop at one end and having their opposite ends integrally joined by a rigid pivot bar rotatably mounted in said conformal grooves of said plates;

at least one of said rigid plates including a plurality of openings to allow passage of ambient air to said filter material;

said filter material is a pad composed of a close-mesh, open cell foam; and said ear supported members are rigidly joined together by said rigid pivot bar and said pivot bar is disposed in rotational relationship in said conformal grooves whereby said ear support member rotates in unison as said pivot bar rotates in said conformal groove.

*2. A nose filter comprising:*

*a base assembly;*

*a filter material, said filter material removably attachable to said base assembly;*

*a single one-piece U-shaped ear support element pivotally connected to said base assembly for removably retaining said base assembly and said filter material on a facial area;*

*said base assembly including a pair of rigid plates supporting said ear support element;*

*said rigid plates having mated and aligned conformal grooves for pivotally mounting said ear support element;*

*said ear support element having a pair of support members with each member having a semi-loop at one end and having their opposite ends integrally joined by a rigid pivot bar rotatably mounted in said conformal grooves of said plates; and*

*at least one of said rigid plates including a plurality of openings to allow passage of ambient air to said filter material.*

*3. A nose filter comprising:*

*a base assembly;*

*a filter material;*

*an attachment member for retaining said filter material on said base assembly;*

*a single one-piece U-shaped ear support element pivotally connected to said base assembly for removably retaining said base assembly and said filter material on a facial area;*

*said base assembly including a pair of rigid plates supporting said ear support element;*

*said rigid plates having mated and aligned conformal grooves for pivotally mounting said ear support element;*

*said ear support element having a pair of support members with each member having a semi-loop at one end and having their opposite ends integrally joined by a rigid pivot bar rotatably mounted in said conformal grooves of said plates; and*

*at least one of said rigid plates including a plurality of openings to allow passage of ambient air to said filter material.*

* * * * *